(12) United States Patent
de Heer et al.

(10) Patent No.: US 7,904,924 B1
(45) Date of Patent: Mar. 8, 2011

(54) VIDEO-ON-DEMAND RECOMMENDATIONS BASED ON PREVIOUSLY VIEWED TELEVISION PROGRAMS

(75) Inventors: Dave de Heer, Woodside, CA (US); Bruce Jenks, San Carlos, CA (US)

(73) Assignee: Microsoft Corporation, Redmond, WA (US)

( * ) Notice: Subject to any disclaimer, the term of this patent is extended or adjusted under 35 U.S.C. 154(b) by 1908 days.

(21) Appl. No.: 10/700,966

(22) Filed: Oct. 31, 2003

(51) Int. Cl.
*G06F 3/00* (2006.01)
*G06Q 30/00* (2006.01)

(52) U.S. Cl. .......................... 725/46; 705/347
(58) Field of Classification Search ................. 725/46, 725/87
See application file for complete search history.

(56) References Cited

U.S. PATENT DOCUMENTS

| | | | |
|---|---|---|---|
| 6,041,311 A | 3/2000 | Chislenko et al. | |
| 6,049,777 A | 4/2000 | Sheena et al. | |
| 6,088,722 A * | 7/2000 | Herz et al. | 709/217 |
| 6,092,049 A | 7/2000 | Chislenko et al. | |
| 6,112,186 A | 8/2000 | Bergh et al. | |
| 6,704,931 B1 * | 3/2004 | Schaffer et al. | 725/46 |
| 7,134,131 B1 * | 11/2006 | Hendricks et al. | 725/31 |
| 7,188,355 B1 * | 3/2007 | Prokopenko et al. | 725/46 |
| 2002/0019763 A1 * | 2/2002 | Linden et al. | 705/10 |
| 2002/0042921 A1 * | 4/2002 | Ellis | 725/87 |
| 2002/0178448 A1 * | 11/2002 | Kiefte et al. | 725/46 |
| 2002/0199194 A1 * | 12/2002 | Ali | 725/46 |
| 2003/0066068 A1 * | 4/2003 | Gutta et al. | 725/9 |
| 2003/0097300 A1 * | 5/2003 | Gutta et al. | 705/14 |
| 2003/0110491 A1 * | 6/2003 | Rodriguez et al. | 725/39 |
| 2003/0208755 A1 * | 11/2003 | Zimmerman | 725/34 |
| 2003/0229898 A1 * | 12/2003 | Babu et al. | 725/87 |
| 2004/0199484 A1 * | 10/2004 | Smith et al. | 706/52 |
| 2007/0106656 A1 * | 5/2007 | Gutta | 707/5 |

OTHER PUBLICATIONS

"Algorithms for Association Rule Mining- A General Survey and Comparision", Hipp et al., SIGKDD Explorations, Newsletter of the ACM Special Interest Group on Knowledge Discovery and Data Mining, Jun. 2000, vol. 2, Issue 1, pp. 58-64 including 2 page newsletter cover from website.

"A Feature-based Approach to Recommending Selections based on Past Preferences", Raskutti et al., User Modeling and User-Adapted Interaction, vol. 7, No. 3, 1997, pp. 179-218.

* cited by examiner

*Primary Examiner* — Brian T Pendleton
*Assistant Examiner* — Jean D Saint Cyr
(74) *Attorney, Agent, or Firm* — Lee & Hayes, PLLC

(57) ABSTRACT

Techniques for generating meaningful video-on-demand recommendations based on television viewing history data are described. Television viewing history data and video-on-demand purchase data are gathered from multiple client devices within a network. Television programs and videos-on-demand that are watched and purchased, respectively, using the same client device are associated with each other. Weights are assigned to the associations based on percentages or statistical analysis of the number of client devices through which particular videos-on-demand are purchased and television programs are watched. When a viewer requests video-on-demand recommendations, such recommendations are automatically generated based on comparisons between television viewing history data associated with the viewer and the television program/video-on-demand associations.

44 Claims, 11 Drawing Sheets

US 7,904,924 B1

VIDEO-ON-DEMAND RECOMMENDATIONS BASED ON PREVIOUSLY VIEWED TELEVISION PROGRAMS

TECHNICAL FIELD

This invention relates to automated video-on-demand recommendations, and more specifically to generating video-on-demand recommendations based on data that identifies previously viewed television programs.

BACKGROUND

Systems currently exist that support collection of television data that identifies broadcast television programs that have been watched through a particular client device, such as a cable television set-top box. Furthermore, systems currently exist that automatically generate broadcast television recommendations based on the television data that is gathered. For example, a television recommendation system may recommend broadcast television programs to a particular viewer based on a comparison of television data associated with the particular viewer and television data associated with other viewers, resulting in a "other viewers who watched television program X also watched television program Y" type of recommendation.

Additionally, video-on-demand (VOD) systems currently exist that record data that identifies VOD purchases associated with a particular viewer. Similar to the broadcast television recommendations, VOD recommendations may be generated based on the gathered VOD data. However, VOD differs from broadcast television programs in that new VOD titles may become available periodically (e.g., monthly or weekly), and older VOD titles may no longer be available, and viewers typically watch a significantly fewer number of VOD titles than they do broadcast television programs. These two factors combined result in a much thinner VOD data set when compared to the television data set, and therefore results in less meaningful VOD recommendations.

Accordingly, a need exists for techniques for generating meaningful VOD recommendations, even when historical VOD data for a particular viewer is thin or non-existent.

SUMMARY

A technology for automatically generating video-on-demand recommendations is described. Television viewing history data is gathered for multiple client devices within a network. The television viewing history data identifies broadcast television programs that are watched using the client devices. Video-on-demand (VOD) data is also gathered that identifies VOD content that is purchased or viewed using the client devices. Weighted associations are generated between the television data and the VOD data to represent the likelihood that a viewer who watches a particular television program will also purchase a particular video-on-demand.

In one implementation, the associations are weighted based on the percentage of viewers who purchase or watch a particular video-on-demand and who also have watched a particular television program. In an alternate implementation, the associations are weighted according to a lift algorithm, which is used to calculate a ratio of probabilities. The ratio is defined as the conditional probability that a viewer will purchase a particular video-on-demand given that the viewer has already watched a particular television program divided by the probability that any viewer will purchase the particular video-on-demand.

In an alternate implementation, a data mining engine is used to generate a decision tree for each VOD title using the TV viewing data to generate tree splitting criteria (e.g., a probabilistic classification tree using a Bayesian score as a splitting criteria).

In another alternate implementation, a data mining engine may be used to apply association rules algorithms to generate probabilities that a particular VOD title may be purchased or viewed given that particular combinations of television programs have been watched.

After the associations are generated, video-on-demand recommendations may be generated by comparing the associations with television viewing history data that is associated with a particular viewer. In an exemplary implementation, videos-on-demand that have highly weighted associations with one or more television programs that the viewer has watched are recommended.

DETAILED DESCRIPTION

Overview

The embodiments described below provide techniques for generating meaningful video-on-demand (VOD) recommendations based on broadcast television viewing history data. In the described exemplary implementation, a cable television system headend broadcasts television programs to, and receives television data from, multiple client devices (e.g., television set-top boxes). The television data identifies broadcast television programs that have been watched through one or more of the client devices. In addition, the cable television system headend maintains VOD data that is generated when a viewer purchases or watches a VOD through one of the client devices. A headend process then generates associations between the VOD data and the television data. For example, if a significant number of viewers who purchased or watched a particular VOD also watched a particular television program, then the television program is associated with the VOD.

A VOD recommendation application executed on a client device provides a user interface that enables a viewer to request VOD recommendations. The headend system generates VOD recommendations by examining television data associated with the viewer, and then identifying VODs that are associated with one or more of the television programs that the viewer has previously watched.

Exemplary Environment

Figure 1:
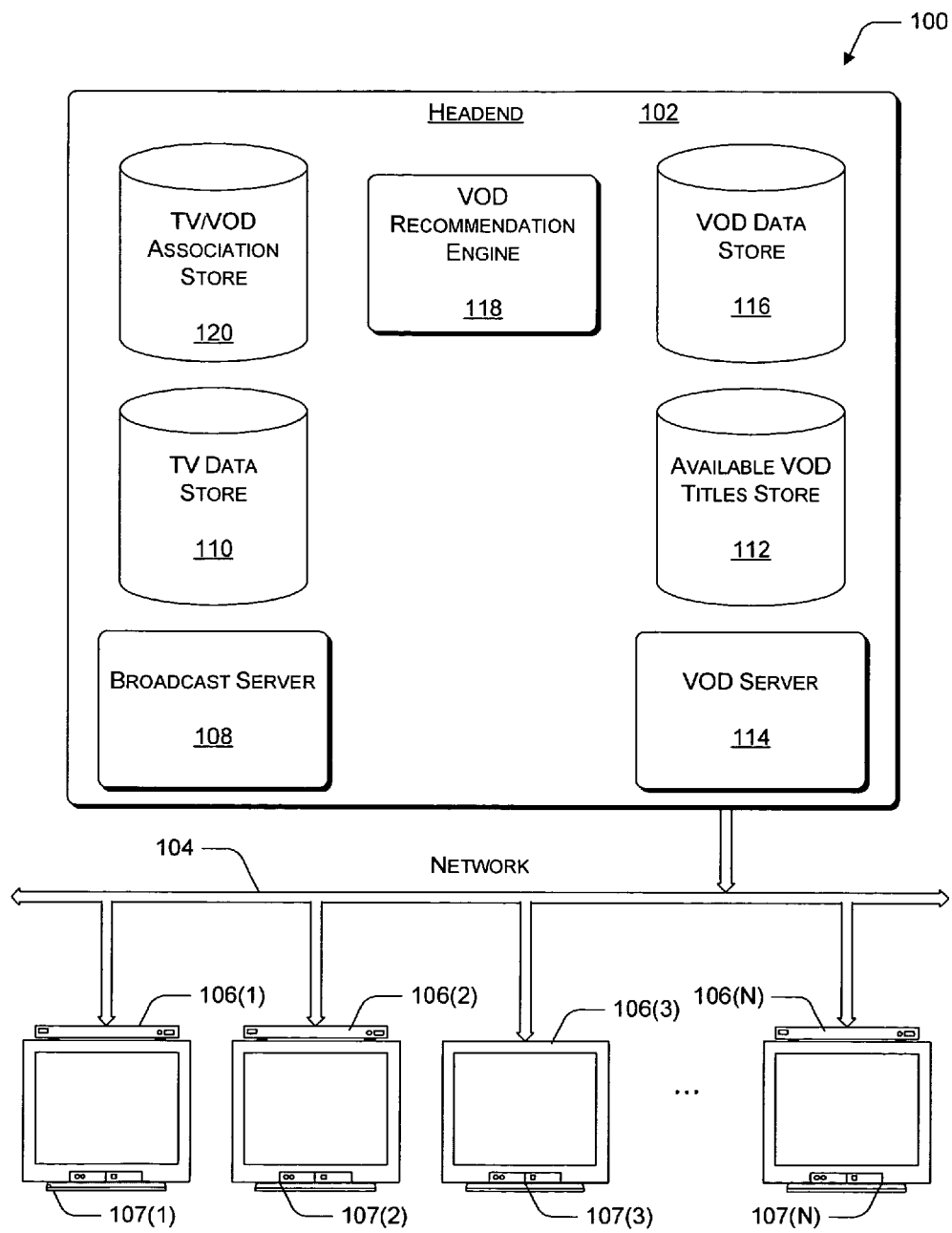
FIG. 1 is a block diagram that illustrates an exemplary network environment in which video-on-demand recommendations may be generated.

FIG. 1 illustrates an exemplary environment 100 that supports automatic generation of meaningful VOD recommendations. Environment 100 includes a headend 102, a network 104, and multiple client devices 106(1), 106(2), 106(3), . . . , 106(N), each connected to a corresponding display device 107(1), 107(2), 107(3), . . . , 107(N). In the illustrated implementation, headend 102 is representative of a cable television system headend, and client devices 106 are representative of television set-top boxes or any other type of client device configured to receive broadcast television programs and other data over network 104.

Exemplary headend 102 includes broadcast server 108, TV data store 110, available VOD titles store 112, VOD server 114, VOD data store 116, VOD recommendation engine 118, and TV/VOD association store 120. Headend 102 typically includes other components as well, which are not illustrated in FIG. 1, such as a processor, one or more memory components, one or more network interfaces, and so on.

Broadcast server 108 is configured to transmit broadcast television programs and other data over network 104 to one or more of the client devices 106. Other data that may be broadcast may include, but is not limited to, electronic program guide data and VOD recommendations that may be broadcast over in-band or out-of-band portions of network 104. Broadcast server 108 typically receives television programs over a satellite link (not shown) and remodulates them onto the broadcast network 104.

TV data store 110 stores data received from one or more of client devices 106, the data identifying broadcast television programs that have been watched using the client device 106. For example, during configuration of a client device 106, a viewer may be given the opportunity to participate in a data collection system, which may or may not be exclusively associated with generating VOD recommendations. For example, television viewing history data may be collected for other reasons, such as targeted advertising, but the data that is collected may also be used for other purposes, such as generating VOD recommendations. If the viewer chooses to participate in such a system, then for example, anytime the client device is tuned to a particular broadcast television program for at least some given period of time (e.g., three minutes), then data is sent from the client device to the headend indicating that the particular broadcast television program has been watched using the particular client device. This data is stored in TV data store 110. In an exemplary implementation, each record stored in TV data store 110 includes a client device identifier and a program identifier. Other data fields may also be stored including, for example, a time of day during which the program was watched. An example data structure that may be associated with TV data store 110 is described in further detail below with reference to FIG. 8. Techniques for collecting such television data are well known to those skilled in the art.

Available VOD titles store 112 maintains a listing of VOD titles that are currently available for purchase. VOD server 114 is configured to manage the sale and distribution of those VOD titles to client devices 106. Listings of available VOD titles are broadcast over network 104 to client devices 106. When a viewer chooses to purchases a VOD, VOD server 114 receives from the client device data identifying the client device and the VOD title being purchased. This data is stored in VOD data store 116. As with collection of television data, distribution of VODs and collection of VOD data is well known to those skilled in the art.

VOD recommendation engine 118 is configured to associate TV data stored in TV data store 110 with VOD data stored in VOD data store 116. These data associations are then stored in TV/VOD association store 120. Generation of the TV/VOD associations is described in further detail below with reference to FIG. 9. VOD recommendation engine 118 is further configured to generate VOD recommendations based on data stored in TV data store 110 and TV/VOD association store 120. Generation of VOD recommendations is described in further detail below with reference to FIG. 10.

Although shown as a component of headend 102, VOD server 114 may, in alternate implementations, be configured as a separate system or as a component of a separate system. In such an implementation, the VOD server system communicates with headend 102 to provide the data that is stored in VOD data store 116.

Client devices 106(1), 106(2), 106(3), . . . , 106(N) are configured to receive broadcast television programs, video-on-demand content, and other data (e.g., electronic program guide data) over network 104. Client devices 106 may be implemented as any of a number of devices, such as a television set-top box, a TV recorder with a hard disk, a personal computer, a digital-cable-ready TV that includes facilities to support receipt and control of both digital broadcast and VOD content (illustrated as client device 106(3)), a Media Center device that integrates broadband data and local networks with broadcast and VOD content for display on one or more TV display devices, and so on. Furthermore, network 104 may be implemented as any type of network that supports the client devices 106. This may include two-way hybrid fiber/coax digital cable systems or IP-oriented or other point-to-point broadband data systems that support digital television broadcast and VOD content.

Exemplary Client Device

Figure 2:
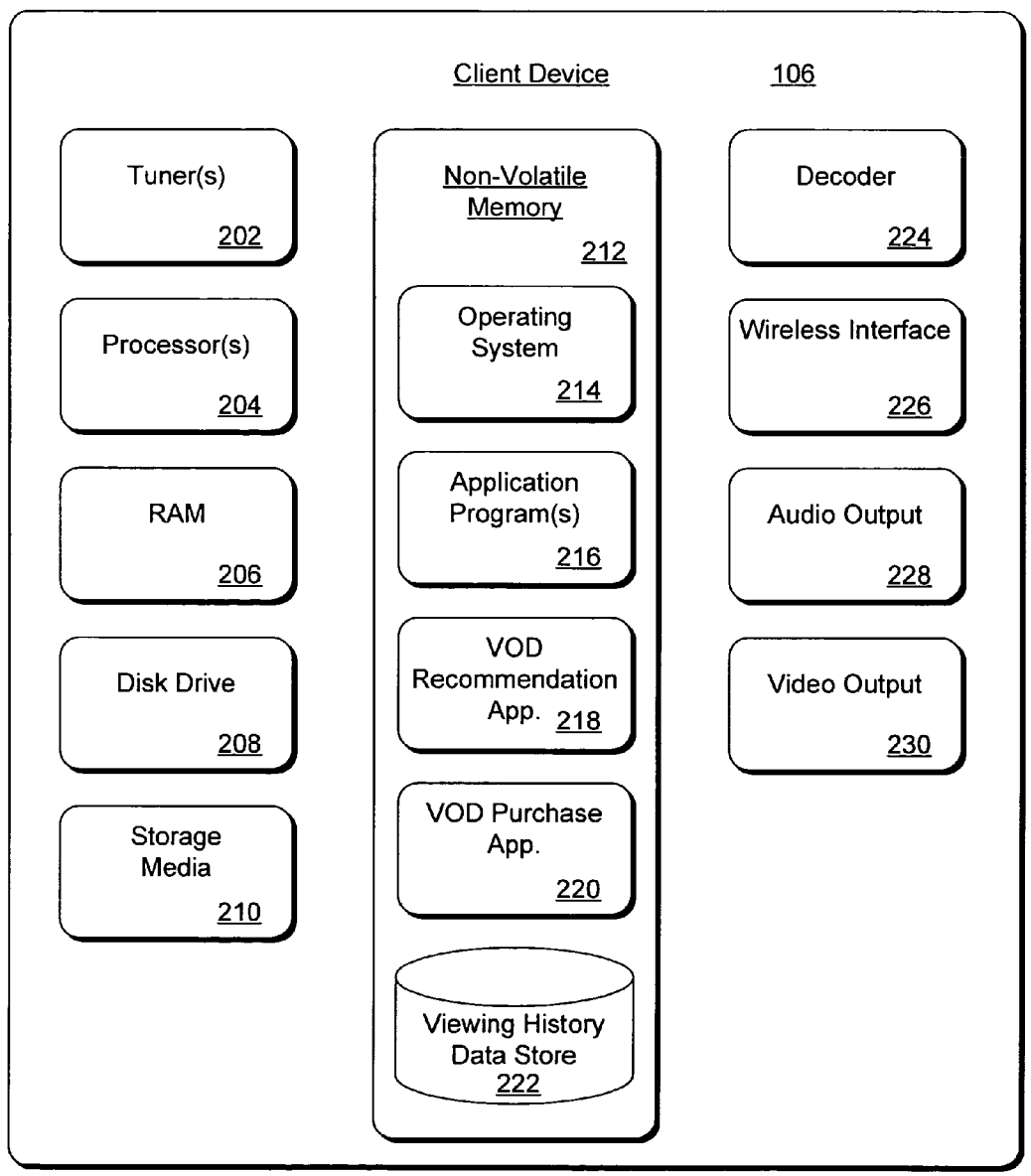
FIG. 2 is a block diagram that illustrates select components of an exemplary client device that may be implemented as part of the network shown in FIG. 1.

FIG. 2 illustrates select components of an exemplary client device 106. Client device 106 can be implemented in any number of embodiments, including as a set-top box, a TV recorder with a hard disk, a personal computer, and so forth. Client device 106 includes one or more tuners 202. Tuners 202 are representative of one or more in-band tuners that tune to various frequencies or channels to receive television signals, as well as an out-of-band tuner that tunes to a broadcast channel over which other data, such as electronic program guide (EPG) data or listings of available VOD titles, may be broadcast to client device 106.

Client device 106 also includes one or more processors 204 and one or more memory components. Examples of possible memory components include a random access memory (RAM) 206, a disk drive 208, a mass storage component 210, and a non-volatile memory 212 (e.g., ROM, Flash, EPROM, EEPROM, etc.). Alternative implementations of client device 106 can include a range of processing and memory capabilities, and may include more or fewer types of memory components than those illustrated in FIG. 2.

Processor(s) 204 process various instructions to control the operation of client device 106 and to communicate with other electronic and computing devices. The memory components (e.g., RAM 206, disk drive 208, storage media 210, and non-volatile memory 212) store various information and/or data such as content, EPG data, configuration information for client device 106, graphical user interface information, and/or viewing history data.

An operating system 214 and one or more application programs 216 may be stored in non-volatile memory 212 and executed on processor 204 to provide a runtime environment. A runtime environment facilitates extensibility of client device 106 by allowing various interfaces to be defined that, in turn, allow application programs 216 to interact with client device 106. Alternatively, application programs 216 may be spooled from headend 102 and executed at the appropriate time on client processor 204.

VOD recommendation application 218 and VOD purchase application 220 are two specific applications that may be stored in non-volatile memory 212 (or spooled from headend 102) and executed on processor 204. VOD recommendation application 218 enables a viewer to request and receive VOD recommendations that are based on previous television viewing data. An example user interface that may be associated with VOD recommendation application 218 is described below with reference to FIGS. 3-6. VOD purchase application 220 enables a viewer to purchase VOD content. VOD purchase applications are well known to those skilled in the art.

In the illustrated example, a viewing history data store 222 is stored in memory 212 to maintain data associated with television viewing history, such as a log of viewed television programs.

Client device 106 also includes a decoder 224 to decode a broadcast video signal, such as a DVB or MPEG-2 or other digitally-encoded video signal. Client device 106 further includes a wireless interface 226, which allows client device 106 to receive input commands and other information from a user-operated input device, such as from a remote control device or from another IR, Bluetooth, or similar RF input device.

Client device 106 also includes an audio output 228 and a video output 230 that provide signals to a television or other device that processes and/or presents or otherwise renders the audio and video data. Although shown separately, some of the components of client device 106 may be implemented in an application specific integrated circuit (ASIC). Additionally, a system bus (not shown) typically connects the various components within client device 106. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Client device 106 can also include other components, which are not illustrated in this example for simplicity purposes. For instance, client device 106 can include a user interface application and user interface lights, buttons, controls, etc. to facilitate viewer interaction with the device.

Video-On-Demand Recommendation Application

Figure 3:
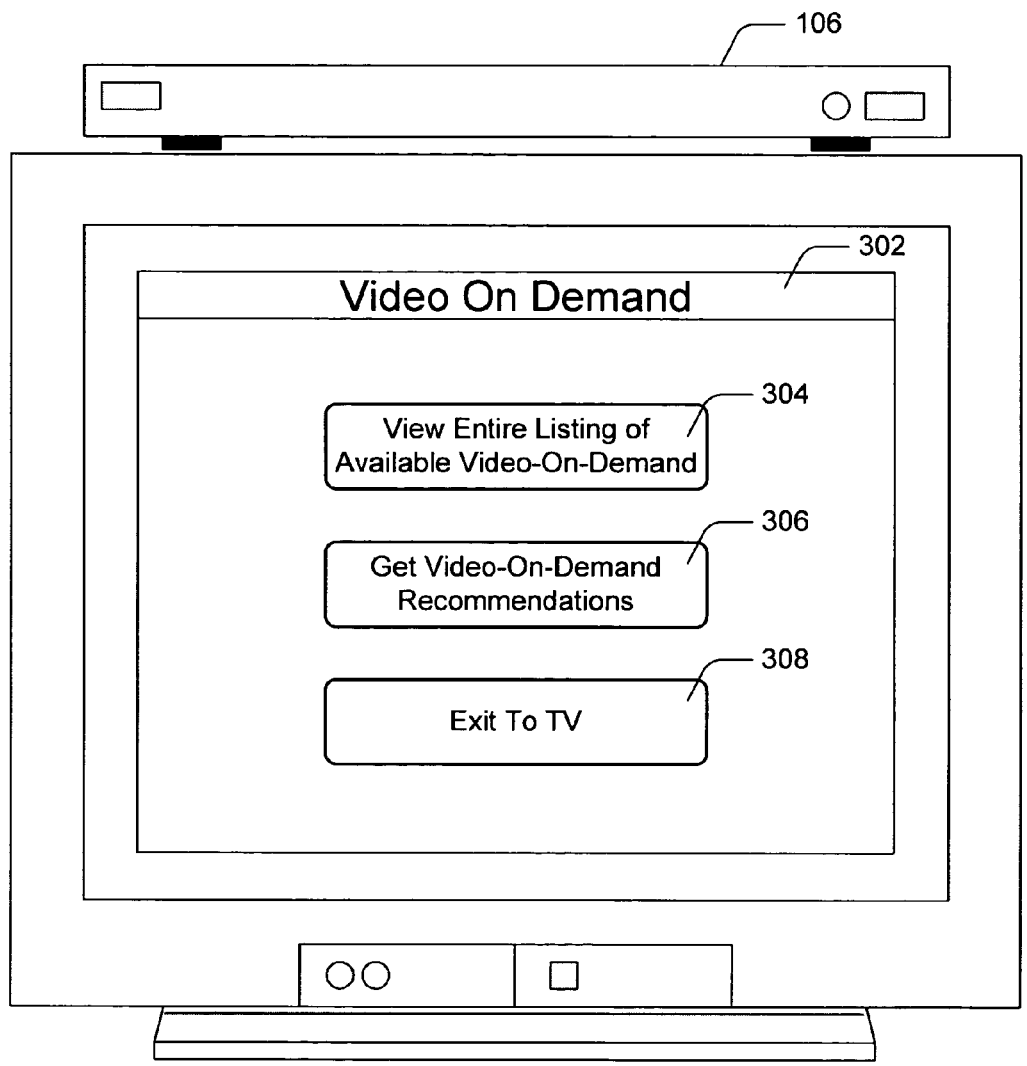
FIG. 3 is a diagram that illustrates a portion of an exemplary user interface for enabling viewer request of video-on-demand recommendations.

FIG. 3 illustrates a portion of an exemplary user interface 302, through which a viewer may request VOD recommendations. In the described implementation, when the VOD recommendation application 218 is launched, for example, by a viewer from a main system menu, a user interface screen similar to that shown in FIG. 3 is displayed. The screen may include a selectable VOD listing button 304, a selectable VOD recommendations button 306, and a selectable exit button 308.

The VOD listing button 304, when selected, causes a listing of all available VOD titles to be displayed. This type of display may be generated using commonly known technology to receive and display a list of available VOD titles.

For example, a listing of available VOD titles as stored in available VOD titles store 112 may be downloaded each day and stored on the client device. This local copy of the list may then be displayed to the viewer. Alternatively, a request for the list of available VOD titles may be sent to the server, which in turn sends the list back to the client device.

The VOD recommendations button 306, when selected, causes one or more lists of recommended VOD titles to be displayed. Recommendations may include those titles rated highest by one or more movie critics, those titles that will only be available as VOD for a short period of time (e.g., three days or less), and/or titles that are recommended to a particular viewer based on specific recommendation criteria. Examples of such lists are described in further detail below with reference to FIGS. 4-6.

Figure 4:
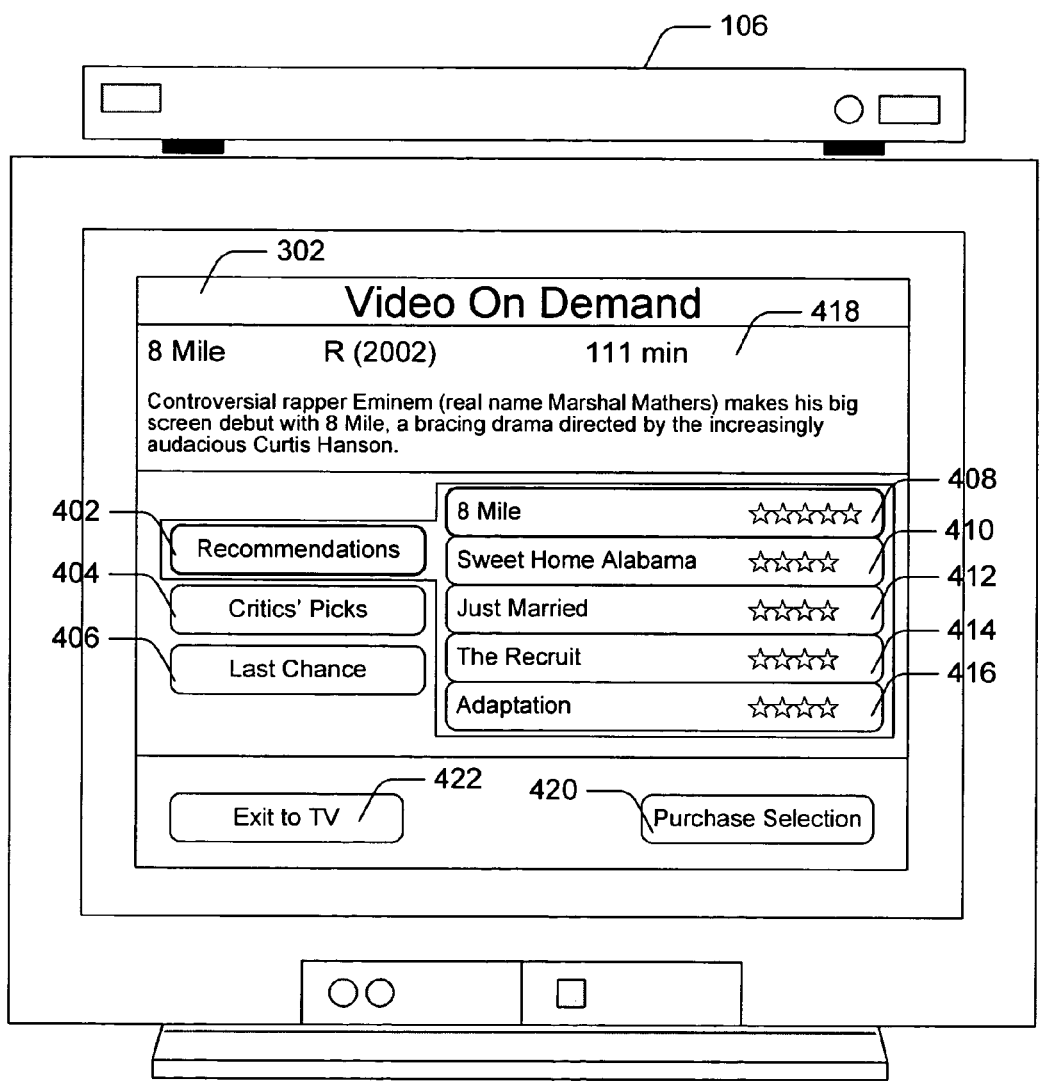
FIG. 4 is a diagram that illustrates a recommendations portion of an exemplary user interface for displaying video-on-demand recommendations.

FIG. 4 illustrates a portion of an exemplary user interface 302 associated with video-on-demand recommendation application 218, as illustrated in FIG. 2. In the illustrated example, a viewer may be presented with three types of recommendations, represented by the recommendations tab 402, the critics' picks tab 404, and the last chance tab 406. In the illustrated implementation, a maximum of five titles are recommended in association with each tag. It is recognized, however, that the number of titles to be recommended may be more or less than that number, which may be configurable or may be dynamically determined depending on the number of titles that fulfill one or more recommendation criteria.

In FIG. 4, the recommendations tab 402 is selected. Recommended VOD titles 408, 410, 412, 414, and 416 represent available VOD titles that have been automatically selected for recommendation to the viewer based on viewer-specific recommendation criteria. For example, in the described implementation, television programs that the viewer has previously watched are compared to television programs that have been previously watched by other viewers. When a match is found, VOD titles that have been purchased by those other viewers are then selected for recommendation to the viewer. An exemplary recommendation generation process is described in further detail below with reference to FIG. 10.

When a viewer selects one of the displayed recommended titles (e.g., "8 Mile" is selected in the illustrated example), a description of the VOD content is displayed in the description area 418 of the user interface. The illustrated user interface screen also includes a purchase button 420 and an exit button 422. When a viewer selects the purchase button 420, a VOD purchase process is initiated for the title that is currently selected. For example, VOD purchase application 220 may be launched. When a viewer selects the exit button 422, the VOD recommendation application closes, and television content that is currently being broadcast is displayed.

Figure 5:
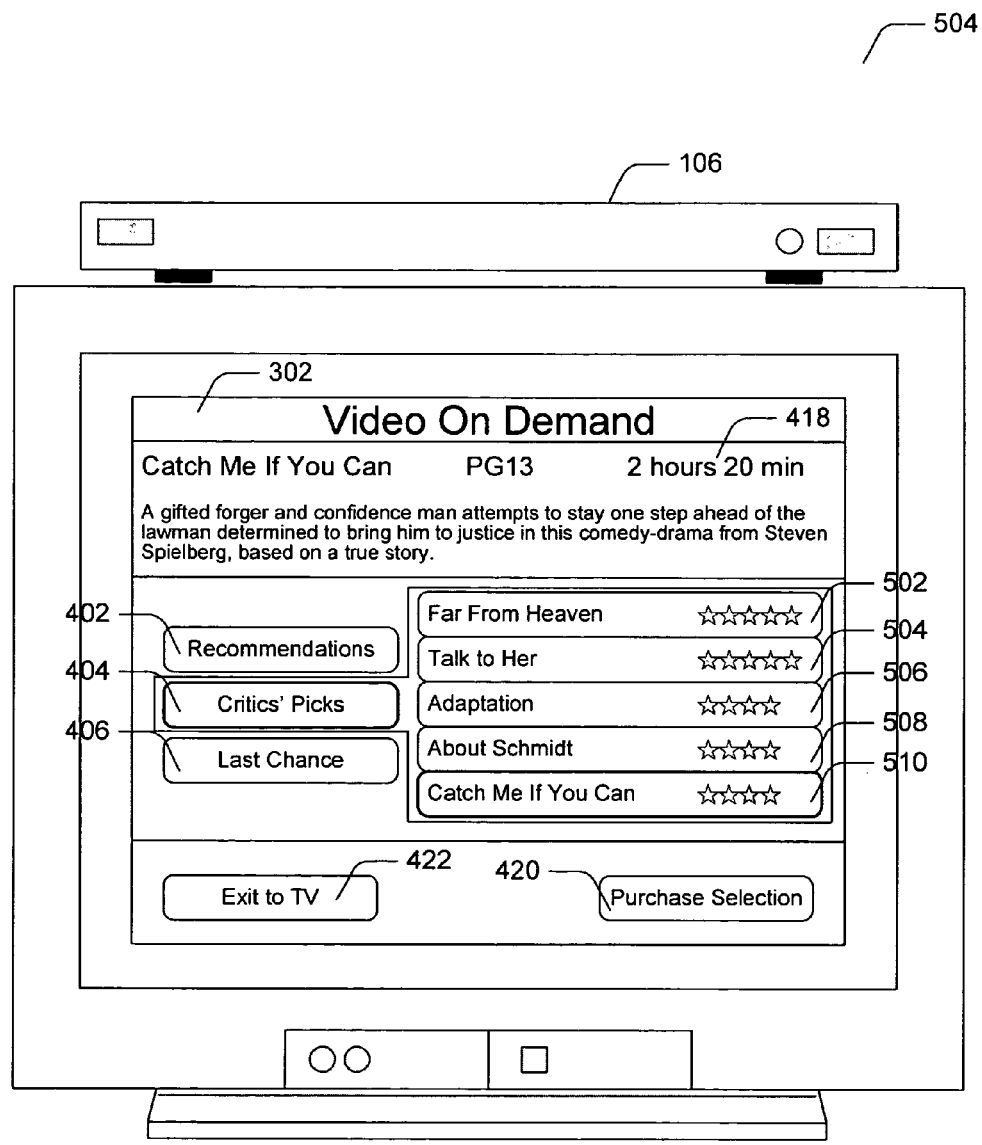
FIG. 5 is a diagram that illustrates a default recommendation portion of an exemplary video-on-demand recommendation user interface that displays available VOD titles with high critic ratings.

FIG. 5 illustrates a portion of user interface 302 that is displayed when the critics' picks tab 404 is selected. VOD titles 502, 504, 506, 508, and 510 represent available VOD titles that have the highest ratings as given by one or more movie critics.

As described above with reference to FIG. 4, when a viewer selects one of the displayed recommended titles (e.g., "25$^{th}$ Hour" is selected in the illustrated example), a description of the VOD content is displayed in the description area 418 of the user interface.

Figure 6:
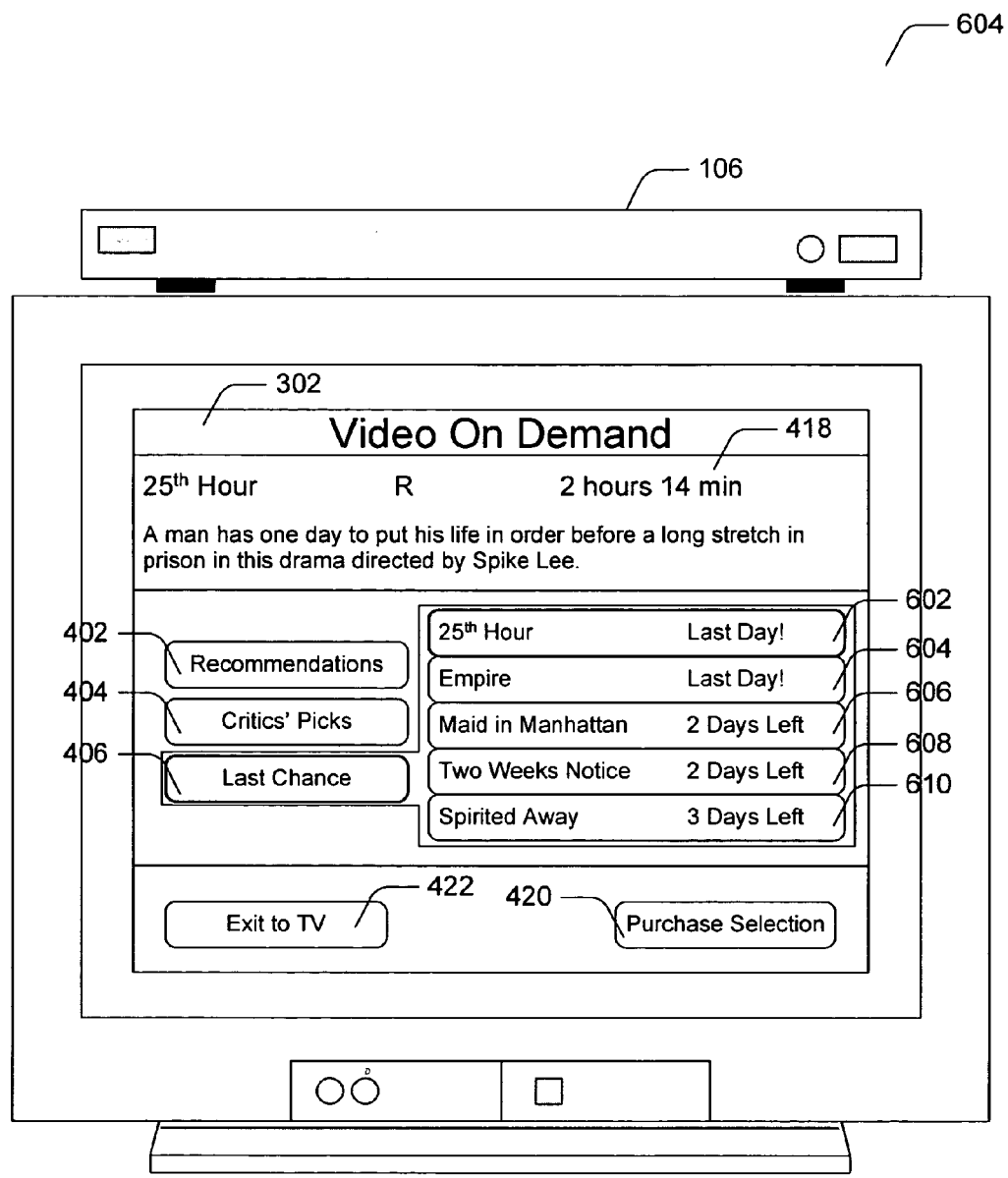
FIG. 6 is a diagram that illustrates a portion of an exemplary video-on-demand recommendation user interface that displays titles that are available for only a short time.

FIG. 6 illustrates a portion of user interface 302 that is displayed when the last chance tab 406 is selected. VOD titles 602, 604, 606, 608, and 610 represent available VOD titles that are available for only a short period of time. For example, those VOD titles that are only available for up to three more days may be displayed, preferably in order so that those expiring soonest are listed first.

Data Structures to Support VOD Recommendation Generation

Figure 7:
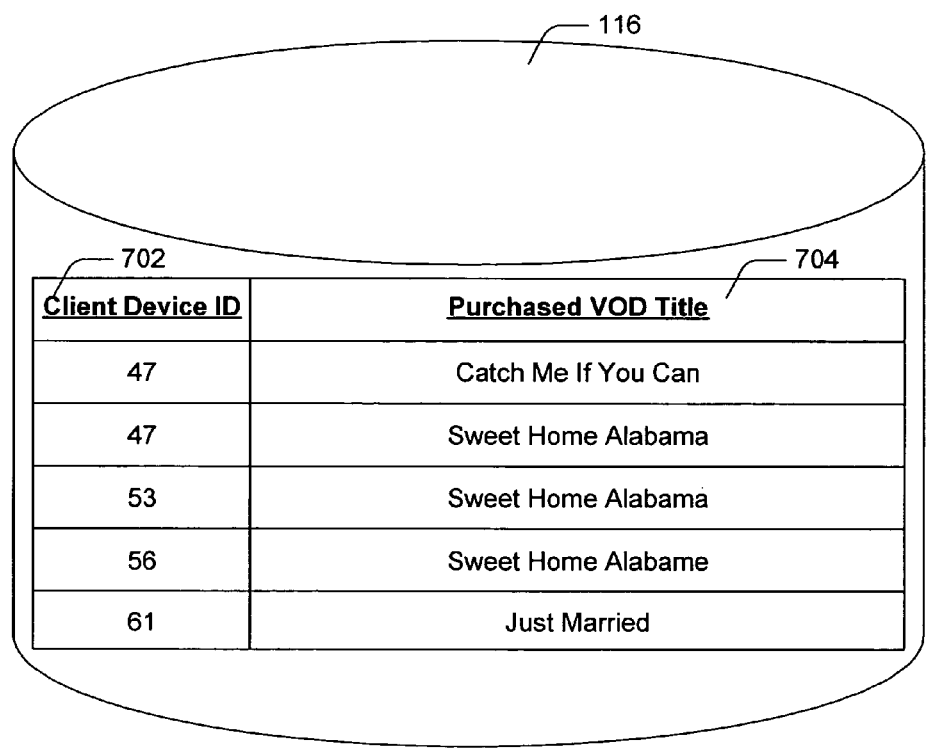
FIG. 7 is a block diagram that illustrates an exemplary structure of a VOD data store as illustrated in FIG. 1.

FIG. 7 illustrates an exemplary data structure for VOD data store 116. In the illustrated example, VOD data store 116 stores multiple records, each including a client device ID 702 and a purchased VOD title 704. In alternate implementations, rather than storing a VOD title, any other type of VOD identifier may be stored. Additionally, VOD data store 116 may also include other data fields, such as a viewer rating of each VOD title, a date purchased, a flag to indicate whether or not the title is still available as a VOD, etc.

The client device ID data field 702 records an identifier associated with a client device 106 through which a particular VOD was purchased. Privacy issues may exist with a system that stores a client device ID that can be used to personally identify a television viewer (e.g., by specifically identifying a particular set-top box). To overcome such issues, in an exemplary implementation, an ID associated with the client device is obfuscated, for example using an obfuscation function, and then the obfuscated client device ID is stored. The purchased VOD title data field 704 records the title of the VOD that was purchased. For example, the data shown in FIG. 7 indicates that a viewer purchased the movie "Catch Me If You Can" as a VOD using a client device having a device ID of 47. The same client device was used to purchase "Sweet Home Alabama" as a VOD. "Sweet Home Alabama" was also purchased by viewers using client devices with device IDs 53 and 56. Furthermore, a viewer purchased "Just Married" using a client device with device ID 61.

The data stored in VOD data store 116 may be collected in any number of ways. For example, if headend 102 includes VOD server 114 (as illustrated in FIG. 1), then the data may be collected directly from the client devices 106 as VODs are purchased. Alternatively, as described above with reference to FIG. 1, VOD server 112 may be implemented as a separate server or as part of a separate system that also communicates with the client devices 106. In such an implementation, headend 102 may receive data to be stored in VOD data store 116 from another system that is responsible for collecting VOD data. Data may be collected from the other system at regular intervals, for example daily or weekly.

Figure 8:
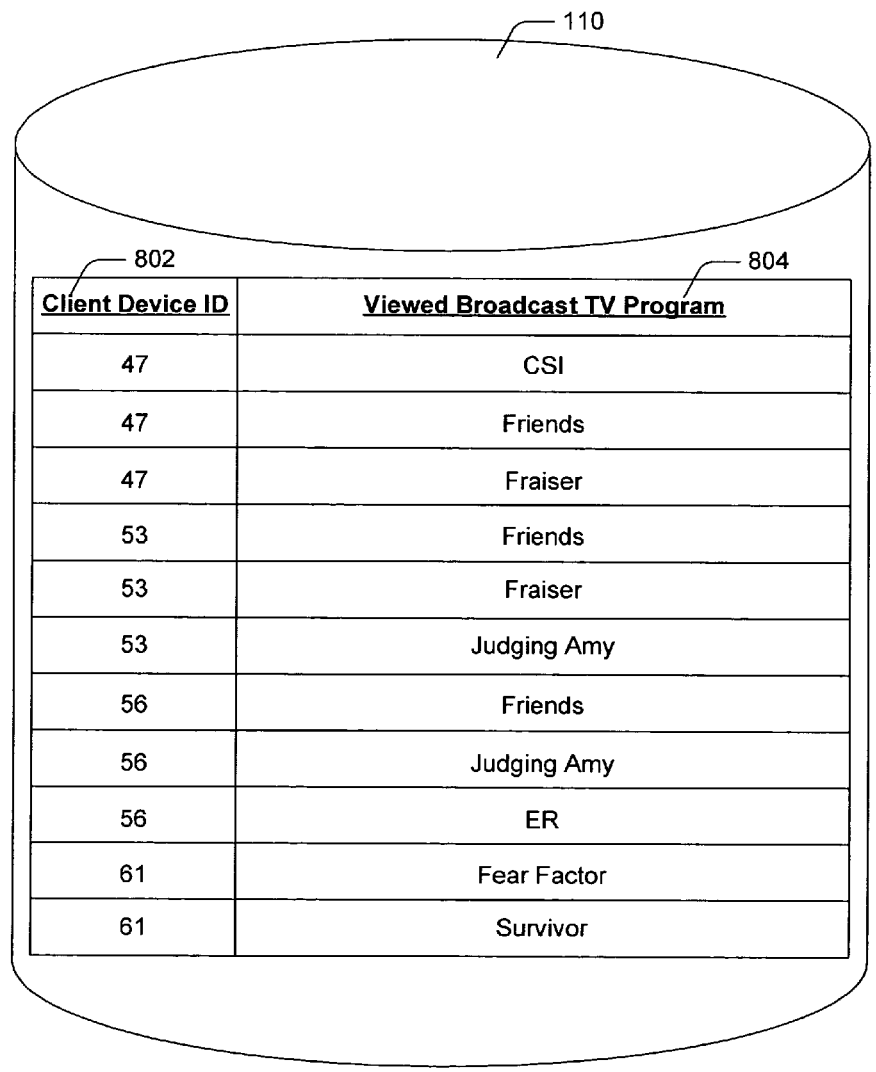
FIG. 8 is a block diagram that illustrates an exemplary structure of a TV data store as illustrated in FIG. 1.

FIG. 8 illustrates an exemplary data structure for TV data store 110. In the illustrated example, TV data store 110 stores multiple records, each including a client device ID 802 and a viewed broadcast TV program 804. FIG. 8 illustrates storing a television program title, although it is recognized that any sort of television program identifier may be stored. Furthermore, it is recognized that FIG. 8 illustrates identifying only the name of a series, with no indication of which episode was viewed, which may also be stored in alternate implementations. Other data may also be stored in TV data store 110, such as frequency or number of times that a particular program has been watched, date and/or time at which a particular program has been watched, etc.

The data that is stored in TV data store 110 is collected from the client devices 106, for example, over an out-of-band channel, which is common in cable television networks. A viewer may typically be given an opportunity to "opt-in", thereby giving permission for data to be collected that describes their viewing habits. In the described implementation, when a viewer opts in, the data is collected by the client device 106 and stored temporarily in viewing history data store 222, as described above with reference to FIG. 2. Then, at regular intervals (e.g., daily, weekly, etc), the data is transferred from the viewing history data store 222 to the headend 102 over network 104, where it is then stored in TV data store 110.

The example data shown in FIG. 8 indicates that one or more viewers using a client device with device ID 47 have watched the television programs "CSI", "Friends", and "Fraiser"; one or more viewers using a client device with device ID 53 have watched the television programs "Friends", "Fraiser", and "Judging Amy"; one or more viewers using a client device with device ID 56 have watched the television programs "Friends", "Judging Amy", and "ER"; and one or more viewers using a client device with device ID 61 have watched the television programs "Fear Factor" and "Survivor".

Figure 9:
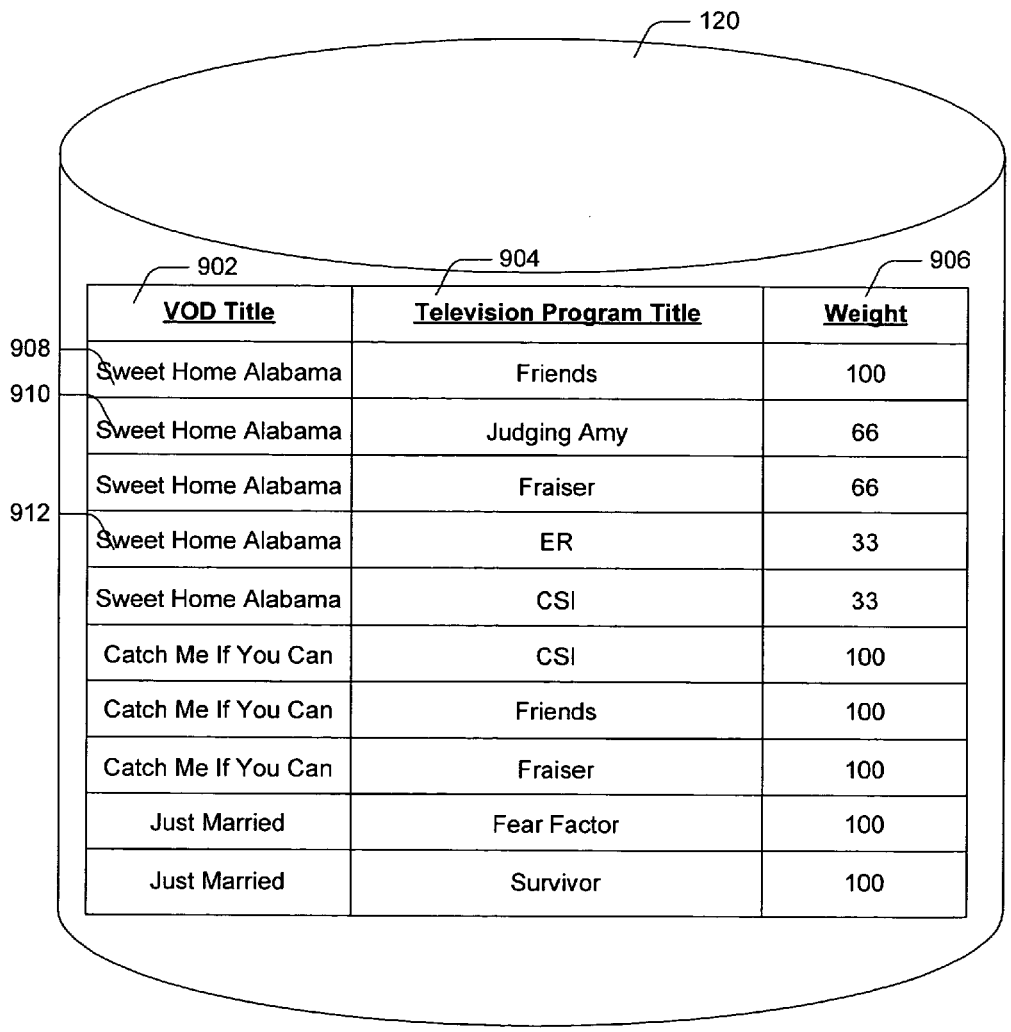
FIG. 9 is a block diagram that illustrates an exemplary structure of a TV/VOD association store as illustrated in FIG. 1.

FIG. 9 illustrates an exemplary data structure for TV/VOD association store 120. In the illustrated example, TV/VOD association store 120 stores multiple records, each including a VOD title 902, a television program title 904, and a weight 906. It is recognized, that as in FIG. 8, FIG. 9 illustrates identifying only the name of a television series, with no indication of which episode was viewed, which may also be stored in alternate implementations.

The example data shown in FIG. 9 is representative of TV/VOD associations that may be generated by VOD recommendation engine 116 based on the example data shown in FIGS. 7 and 8. For example, the VOD title "Sweet Home Alabama" is associated with the television programs "Friends", "Judging Amy", "Fraiser", "ER", and "CSI" because the listed television programs were viewed through client devices through which the VOD title was also purchased (i.e., client device IDs 47, 53, and 56). Similarly, the VOD title "Catch Me If You Can" is associated with the television programs "CSI", "Friends", and "Fraiser" because that VOD title and those television programs were purchased and viewed, respectively, through a client device with device ID 47; and the VOD title "Just Married" is associated with the television programs "Fear Factor" and "Survivor" because that VOD title and those television programs were purchased and viewed, respectively, through a client device with device ID 61.

The weight data field 906 is used to describe the strength or reliability of each of the TV/VOD associations. In the illustrated example, the value of the weight data field represents the percentage of viewers who purchased a particular VOD title and also watched the associated TV program. For example, in the first record 908, the value of 100 in the weight data field 906 indicates that the television program "Friends" was watched through 100 percent of the client devices through which "Sweet Home Alabama" was purchased as a VOD. In the second record 910, the value of 66 in the weight data field 906 indicates that the television program "Judging Amy" was watched through 66 percent of the client devices through which "Sweet Home Alabama" was purchased as a VOD. Similarly, in the fourth record 912, the value of 33 in the weight data field 906 indicates that the television program "ER" was watched through only 33 percent of the client devices through which "Sweet Home Alabama" was purchased as a VOD.

Accordingly, the data stored in TV/VOD association store 118 can be used to generate meaningful VOD recommendations for viewers. For example, if a viewer who watches CSI requests a VOD recommendation, based on the example data shown in FIG. 9, "Catch Me If You Can" and "Sweet Home Alabama" may both be identified as possible recommendations. Based on the weight, however, "Catch Me If You Can" would be a better recommendation than "Sweet Home Alabama" because 100 percent of the viewers who purchased "Catch Me If You Can" also watched "CSI"; on the other hand, only 33 percent of the viewers who purchased "Sweet Home Alabama" also watched "CSI".

It is recognized that there are many techniques for weighting associations between two types of data, and it is hereby recognized that any of those techniques may be used to generate meaningful values for the weight data field 906.

In a particular alternate implementation, a lift algorithm is used. Using the lift algorithm, the value of the weight data field is calculated as the conditional probability that a viewer will purchase the VOD title given that the user has already watched the associated television program divided by the probability that any viewer will purchase the VOD title. Use of the lift algorithm results in a fewer number of personalized recommendations for VOD titles that are popular with a large portion of the general population and a greater number of personalized recommendations for VOD titles that are popular among groups of people who also watch a particular television program.

Video-On-Demand Recommendation Method

Figure 10:
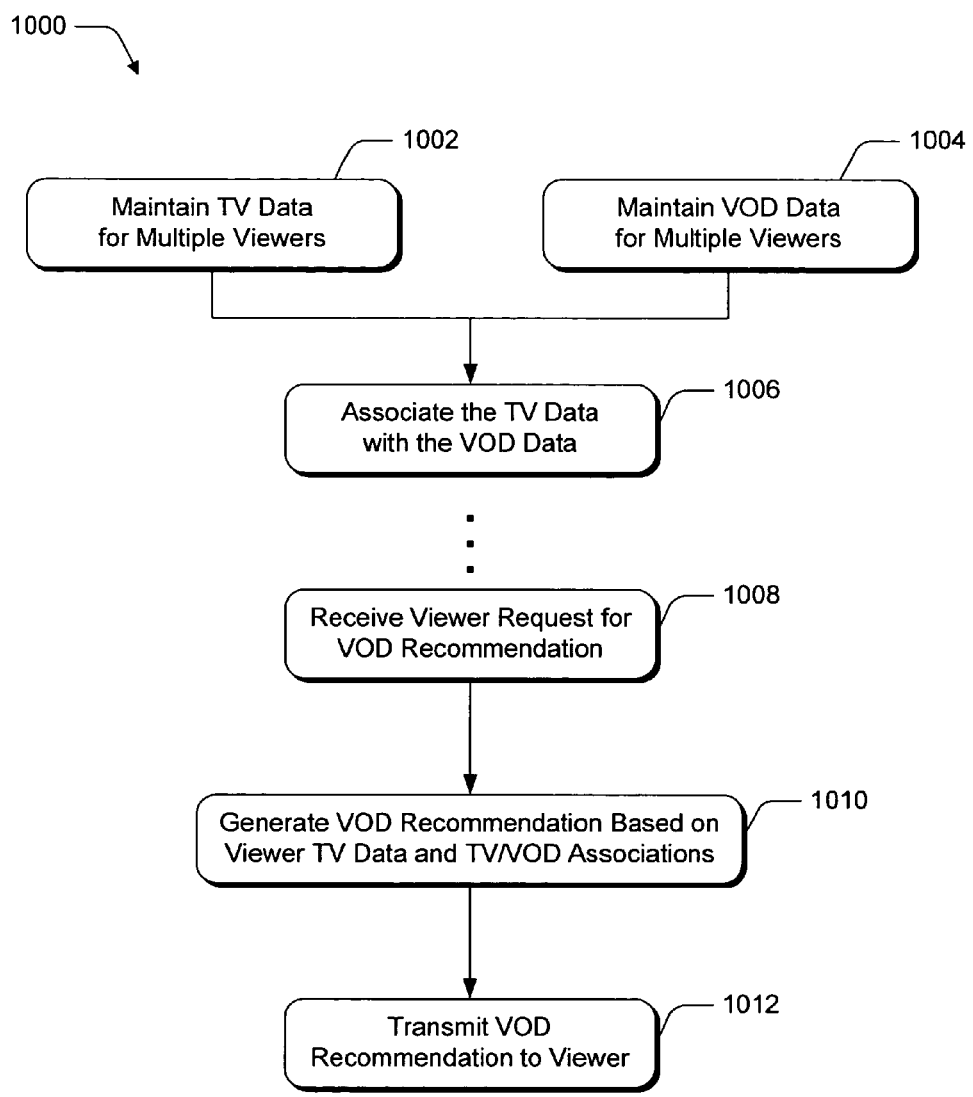
FIG. 10 is a flow diagram that illustrates an exemplary VOD recommendation generation process.

FIG. 10 is a flow diagram that illustrates an exemplary video-on-demand recommendation method 1000. The illustrated process can be implemented in any suitable hardware, software, firmware or combination thereof. In the described implementation, the illustrated process is performed by a server system such as headend 102 as illustrated in FIG. 1.

At block 1002, the headend maintains TV data for multiple television viewers. In an exemplary implementation, a client device records data that indicates that a particular program has been viewed, for example, when the channel on which the program is being aired is tuned to for at least three minutes. The client device then transmits that data to headend 102, where it is maintained in TV data store 110.

At block 1004, the headend maintains VOD data for multiple television viewers. The VOD data identifies which on demand videos have been purchased through which client devices. For example, a list of available VODs is broadcast to multiple client devices. A television viewer may purchase one of the VODs, causing the VOD content to be downloaded to the viewer's client device. Data associated with the purchase process (e.g., a client device identifier and a VOD identifier) is transmitted from the client device to headend 102 where it is maintained in VOD data store 116.

Collection and storage of TV data and VOD data as described above with reference to blocks 1002 and 1004 may be performed continuously, at regular intervals, or at irregular intervals, as data is received from one or more client devices.

At block 1006, the TV data stored in TV data store 110 is associated with VOD data stored in VOD data store 116. For example, a VOD identifier is associated with a television program identifier if the same client device identifier is associated with both the television program and the VOD in the TV data store 110 and the VOD data store 116, respectively. In an exemplary implementation, a weighting factor is assigned to each association based, for example, on a percentage of the client devices that are associated with a particular VOD that are also associated with a particular television program. For example, an association between a particular VOD and a first television program is assigned a high weighting factor if a large percentage of viewers who purchased the VOD also watched the first television program. Similarly, an association between the particular VOD and a second television program is assigned a low weighting factor if only a small percentage of viewers who purchased the VOD also watched the television program.

Alternatively, a lift algorithm may be used to calculate the weighting factor as a ratio of two probabilities. Such an algorithm is described above with reference to FIG. 9.

In another exemplary implementation, in order to associate TV viewing data with VOD purchase data, both the TV viewing data and the VOD purchase data for each client device is combined as a table or set of dependent tables in a database. Because it is difficult to a priori determine the most salient aspect of TV viewing behavior that will create the best recommendations, a data mining engine is used to analyze and score each VOD title for each client. The data mining engine derives from the TV viewing data, predictions for VOD viewing. In one implementation, a decision tree algorithm is used. In this case the data mining engine creates a decision tree for each VOD title using the TV viewing data to generate the tree splitting criteria. The tree that is generated lists from most significant to less significant the TV shows that separate clients who have purchased the VOD from those who have not. In one implementation, the data mining engine creates a probabilistic classification tree using a Bayesian score as a splitting criteria. The VOD titles for which the tree best matches the TV viewing behavior of the client in question receive the best scores.

In alternate implementations, other data mining algorithms, such as association rules algorithms may also be used. An association rule is defined to represent the probabilities that for each set of TV programs viewed by one or more viewers, a particular VOD will be also viewed (or purchased). Because the number of possible TV programs is large, the number of possible combinations of TV programs that can be viewed by any particular viewer is very large. Accordingly, when the data mining engine computes the set of association rules, it prunes them to only include those that provide sufficiently high-quality (i.e. high-confidence) predictions. A more detailed explanation of uses of association rules is given in "Algorithms for Association Rule Mining—A General Survey and Comparison" by Hipp, Guntzer, and Nakhaeizadeh, published in *SIGKDD Explorations, Newsletter of the ACM Special Interest Group on Knowledge Discovery and Data Mining*, June 2000, Volume 2, Issue 1, pages 58-64, which can also be found at http://www.acm.org/sigs/sigkdd/explorations/issue2-1/hipp.pdf, and is hereby incorporated by reference in its entirety.

Once the data mining engine has scored the VOD titles for the client, the VOD titles with the highest scores for each client are stored or transmitted to the client devices.

At block 1008, the headend 102 receives a client device-initiated request for VOD recommendations.

At block 1010, the headend 102 generates VOD recommendations based on TV data associated with the client device and the TV/VOD associations stored in TV/VOD association store 118. For example, VOD recommendation engine 116 identifies VODs to be recommended as those VODs that are associated (with highest weighting factors) with television programs most watched through the client device through which the VOD recommendations were requested.

Alternatively, the headend 102 accesses pre-computed VOD recommendations for the client device.

At block 1012, headend 102 transmits the generated VOD recommendations to the requesting client device.

In a particular implementation, an association between a VOD title and a television program is based, at least in part, on the frequency with which the television program has been watched. For example, an association between a VOD title and a particular television series may have a higher weight value if the television series is watched frequently by viewers who purchased the VOD title. Conversely, an association may be assigned a lower weight value if the particular television series is watched less frequently by those viewers who purchased the VOD title.

In an alternate implementation, VOD recommendations for each client device are pre-determined at regular intervals (e.g., daily or weekly). The pre-determined recommendations may then be broadcast to client devices 106, for example, using a carousel file system over an in-band or out-of-band channel.

Video-On-Demand Recommendation Request Method

Figure 11:
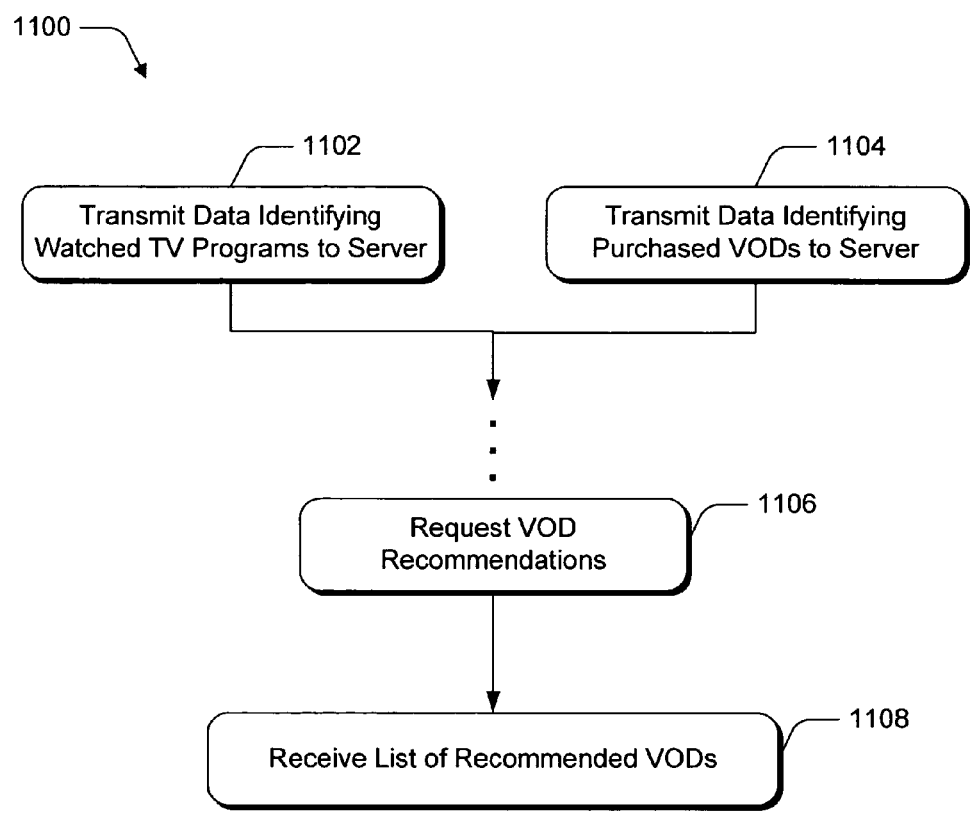
FIG. 11 is a flow diagram that illustrates an exemplary VOD recommendation request process.

FIG. 11 is a flow diagram that illustrates an exemplary video-on-demand recommendation request method 1100. The illustrated process can be implemented in any suitable hardware, software, firmware or combination thereof. In the described implementation, the illustrated process is performed by a client device such as client device 106 as illustrated in FIGS. 1 and 2.

At block 1102, the client device transmits TV data to a server system. For example, client device 106 may record (e.g., based on a viewer opt-in to have data collected) data that identifies television programs that are watched through the client device. The title of the television program being watched may be recorded, for example, if the client device is tuned to the channel on which the program is being broadcast for at least three minutes (or some other configurable length of time). (Setting a threshold time prevents data from being gathered for every program that is scanned while a viewer is, for example, channel surfing.) In one implementation, the data may be gathered and immediately transmitted to the server (e.g., headend 102). Alternatively, the data may be gathered and maintained by the client device in viewing history data store 222 as shown in FIG. 2. In such an implementation, the data may then be transmitted from the viewing history data store 222 to the server at regular intervals, such as once a day.

At block 1104, the client device transmits VOD data to a server system. For example, when a viewer purchases a VOD through client device 106 data that identifies the on-demand video that is being purchased is transmitted from VOD purchase application 220 to VOD server 114. The purchased VOD is then downloaded to the client device. In the illustrated implementation, this function is performed by headend 102, although, as described above, it is recognized that VOD server 114 may be implemented as a separate system or as a component of a system that is separate from headend 102. In such an implementation, all or a portion of the VOD data that is transmitted to the VOD server is then transmitted from the VOD server to the headend 102, where it is stored in VOD data store 116.

It is not necessary for a viewer to have previously purchased VOD content in order to request VOD recommendations. If this is the case, then the processing described with reference to block 1104 will not be performed until a VOD is actually purchased.

At block 1106, a viewer requests VOD recommendations. This may be initiated, for example, through a user interface similar to the one illustrated in FIGS. 3-6. When the viewer initiates the request, a request for VOD recommendations is sent over network 104 to headend 102.

At block 1108, the client device 106 receives from headend 102, one or more lists of recommended on-demand videos. These lists may then be displayed to the user using, for example, a user interface similar to the one illustrated in FIGS. 3-6.

Alternatively, recommendations may be generated at regular intervals (e.g., daily or weekly) and broadcast to the client devices. The recommendations may then be stored at the client device for display when requested by a viewer. Alternatively, pre-computed VOD recommendations may be cached on a VOD proxy server (not shown) that mediates dialog between the VOD server 114 and the client device 106.

Conclusion

The systems and methods described above enable the generation of meaningful VOD recommendations.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method, comprising:
    maintaining television data that identifies broadcast television programs that have been previously viewed by one or more of a plurality of television viewers;
    maintaining VOD data that identifies videos-on-demand that have been purchased by one or more of the plurality of television viewers;
    associating, by a headend, a particular one of the broadcast television programs with a particular one of the videos-on-demand if the television data and the VOD data indicates that a first television viewer watched the particular broadcast television program and purchased the particular video-on-demand, the associating including assigning a weight to the particular broadcast television program that is associated with the particular video-on-demand, wherein the weight describes a strength of association between the particular broadcast television program and the particular video-on-demand and represents a conditional probability that a viewer will purchase the particular video-on-demand based on a factor that the viewer has already watched the particular broadcast television program and a probability that any viewer will purchase the particular video-on-demand; and
    recommending, by the headend, the particular video-on-demand to a second television viewer at a client device if the second television viewer has watched the particular broadcast television program.

2. The method as recited in claim 1, wherein the television data comprises:
    a client device identifier; and
    a television program identifier.

3. The method as recited in claim 2, wherein the client device identifier comprises an obfuscated form of an identifier that uniquely identifies a particular client device.

4. The method as recited in claim 1, wherein the maintaining television data comprises maintaining data that identifies broadcast television programs that have been displayed using a particular client device for, at a minimum, a particular period of time.

5. The method as recited in claim 4, wherein the particular period of time comprises three minutes.

6. The method as recited in claim 1, wherein the VOD data comprises:
    a client device identifier; and
    a VOD identifier.

7. The method as recited in claim 6, wherein the client device identifier comprises an obfuscated form of an identifier that uniquely identifies a particular client device.

8. The method as recited in claim 1, wherein the recommending comprises verifying that the second television viewer has not purchased the particular video-on-demand.

9. The method as recited in claim 1, wherein the recommending comprises verifying that the particular video-on-demand is currently available to be purchased or viewed.

10. The method as recited in claim 1, wherein the weight represents a percentage of viewers who purchased or watched the particular video-on-demand and who also watched the particular broadcast television program.

11. The method as recited in claim 1, wherein the associating comprises associating a broadcast television program identifier with a VOD identifier.

12. The method as recited in claim 11, wherein the associating further comprises associating a weight with the broadcast television program identifier and the VOD identifier.

13. The method as recited in claim 1, wherein the recommending comprises applying a decision tree algorithm to the VOD data and the television data to create a decision tree for each of a plurality of VOD titles using the TV data to generate tree splitting criteria.

14. The method as recited in claim 13, wherein:
the decision tree for each of the plurality of VOD titles comprises a probabilistic classification tree; and
the tree splitting criteria comprises a Bayesian score.

15. A computer-readable storage device having computer-readable instructions stored thereon that, when executed by a processor, implements the method as recited in claim 1.

16. The method as recited in claim 1, wherein the weight is based at least in part on a frequency with which the particular broadcast television program is watched by the first television viewer.

17. A method, comprising:
identifying a video-on-demand that has been purchased by a particular viewer;
associating, by a headend, with the video-on-demand, a broadcast television program that has been watched by the particular viewer, the associating comprising:
creating an association between a television program identifier that is associated with the broadcast television program and a VOD identifier that is associated with the video-on-demand;
assigning a weight to the association, wherein the weight describes a strength of association between the television program identifier and the VOD identifier and the weight represents a conditional probability that a viewer will purchase the video-on-demand based on a factor that the viewer has already watched the particular broadcast television program and a probability that any viewer will purchase the particular video-on-demand; and
recommending, from the headend to a client device, the video-on-demand to another viewer who has watched the broadcast television program.

18. The method as recited in claim 17 wherein the identifying comprises:
maintaining a client device ID that is associated with the viewer; and
maintaining a VOD ID that is associated with the video-on-demand.

19. The method as recited in claim 17, wherein the associating comprises:
determining that the broadcast television program has been watched for at least a minimum period of time; and
associating a television program identifier that is associated with the broadcast television program with a VOD identifier that is associated with the video-on-demand.

20. The method as recited in claim 19, wherein the minimum period of time comprises three minutes.

21. The method as recited in claim 17, wherein the weight comprises a percentage of viewers who purchased the video-on-demand who also watched the broadcast television program.

22. The method as recited in claim 17, wherein the weight is calculated based on association rules that are used to determine for multiple combinations of television programs that may be watched, a probability that a particular VOD will be purchased or watched.

23. The method as recited in claim 17, wherein the recommending comprises determining that the particular viewer has not already purchased the video-on-demand.

24. The method as recited in claim 17, wherein the recommending comprises determining that the video-on-demand is currently available for purchase by the particular viewer.

25. A computer-readable storage device having computer-readable instructions stored thereon that, when executed by a processor, implements the method as recited in claim 17.

26. A method, comprising:
transmitting television viewing history data from a client device to a server system;
transmitting a video-on-demand recommendation request from the client device to the server system; and
receiving, at the client device, a listing of available videos-on-demand that are recommended based on the television viewing history data compared to television viewing history data associated with other viewers who have purchased the recommended videos-on-demand, the association being based at least in part on assigning a weight to the television viewing history of the other viewers that is associated with the recommended videos-on-demand,
wherein the weight describes a strength of association between the television viewing history of the other viewers and the recommended videos-on-demand and represents a conditional probability that a viewer will purchase a particular video-on-demand provided that the viewer has already watched a particular broadcast television program and a probability that any viewer will purchase the particular video-on-demand.

27. The method as recited in claim 26, wherein the television viewing history data comprises:
a client device identifier that uniquely identifies a client device through which broadcast television programs have been received; and
a television program identifier that uniquely identifies a particular broadcast television program that has been watched.

28. A system, comprising:
a network interface, at a headend, for receiving television data that identifies broadcast television programs that have been watched using one or more of a plurality of client devices;
a network interface, at the headend, for receiving VOD data that identifies videos-on-demand that have been purchased through one or more of the plurality of client devices;
a VOD recommendation engine, at the headend, configured to:
associate a portion of the television data with a portion of the VOD data when the portion of the television data identifies a particular one of the broadcast television programs that was watched using a first client device and the portion of the VOD data identifies a particular one of the videos-on-demand that was purchased using the first client device, the associating including assigning a weight to the portion of the television data that is associated with the port of the VOD data, wherein the weight describes a strength of association between the portion of television data and the portion of VOD data and represents a conditional probability that a viewer will purchase the particular video-on-demand based on a factor that the viewer has already watched the particular broadcast television program and a probability that any viewer will purchase the particular video-on-demand; and generate a recommendation, to a second client device, that the particular video-on-demand be purchased based on received television data that indicates that the particular broadcast television program was watched using the second client device.

29. The system as recited in claim 28, further comprising a TV data store for maintaining the television data.

30. The system as recited in claim 28, further comprising a VOD data store for maintaining the VOD data.

31. The system as recited in claim 28, wherein the first client device comprises a cable television set-top box.

32. The system as recited in claim 28, wherein the first client device comprises a digital television recorder.

33. The system as recited in claim 28, wherein the first client device comprises a personal computer.

34. The system as recited in claim 28, wherein the system is implemented as a cable television system headend.

35. A system, comprising:
means for maintaining television data, at a headend, that identifies broadcast television programs that are viewed using one or more of a plurality of client devices;
means for maintaining video-on-demand data, at the headend, that identifies videos-on-demand that are purchased using one or more of the plurality of client devices;
means for creating associations between broadcast television programs and available videos-on-demand, a particular one of the broadcast television programs being associated with a particular one of the videos-on-demand if the particular broadcast television program was watched and the particular video-on-demand was purchased using a particular one of the plurality of client devices, the means for creating associations including means for assigning a weight to the particular broadcast television program that is associated with the particular video-on-demand, wherein the weight describes a strength of association between the particular broadcast television program and the particular video-on-demand and represents a ratio that is defined as a conditional probability that a viewer will purchase the particular video-on-demand provided that the viewer has already watched the particular broadcast television program and a probability that any viewer will purchase the particular video-on-demand; and
means for recommending the particular video-on-demand for purchase through a second one of the plurality of client devices based on a comparison of a portion of the television data that is associated with the second one of the plurality of client devices and the associations between broadcast television programs and available videos-on-demand.

36. The system as recited in claim 35, wherein the means for recommending comprises a decision tree generation algorithm.

37. The system as recited in claim 35, wherein the means for recommending comprises a data mining engine configured to apply association rules which generate probabilities that a particular VOD title will be purchased given that particular combinations of television programs have been viewed.

38. The system as recited in claim 35, further comprising means for determining that the particular video-on-demand has not already been purchased using the second client device.

39. A computer-readable storage device comprising computer-readable instructions that, when executed, cause a computer system to:
gather television data that identifies individual client devices and broadcast television programs that have been watched using the individual client devices;
gather VOD data that identifies individual client devices and videos-on-demand that have been purchased using the individual client devices; and
associate portions of the television data with portions of the VOD data, the associating including assigning a weight to the portions of the television data that are associated with the portions of the VOD data, the weight representing a likelihood that a particular viewer will purchase a particular one of the videos-on-demand based on a factor that the particular viewer has already watched a particular one of the broadcast television programs and a probability that any viewer will purchase the particular video-on-demand.

40. The one or more computer-readable storage device as recited in claim 39, further comprising computer-readable instructions that, when executed, cause the computer system to apply a decision tree algorithm to the VOD data and the television data to create a decision tree for each of a plurality of VOD titles using the TV data to generate tree splitting criteria.

41. The one or more computer-readable storage device as recited in claim 40, wherein:
the decision tree for each of the plurality of VOD titles comprises a probabilistic classification tree; and
the tree splitting criteria comprises a Bayesian score.

42. The one or more computer-readable storage device as recited in claim 39, further comprising computer-readable instructions that, when executed, cause the computer system to apply association rules which generate probabilities that a particular VOD title will be purchased given that particular combinations of television programs have been viewed.

43. The one or more computer-readable storage device as recited in claim 39, further comprising computer-readable instructions that, when executed, cause the computer system to recommend a particular video-on-demand to a particular viewer if the television data indicates that the particular viewer has watched a broadcast television program that is associated with the particular video-on-demand.

44. A computer-readable storage device comprising computer-readable instructions that, when executed, cause a computer system to:
transmit to a server, television data and video-on-demand data that identifies broadcast television programs that have been watched and videos-on-demand that have been purchased using a particular client device;
transmit to the server, a request for a video-on-demand recommendation from a second client device, the server associating the television data with the video-on-demand data; and
receive, at the second client device, a recommendation for a particular one of the videos-on-demand, the recommendation having been generated based, at least in part, on an association between the television data and the video-on-demand data, the association including assigning a weight to the television data that is associated with the video-on-demand data, wherein the weight describes a strength of association between the television data and the VOD data and represents a conditional probability that a viewer will purchase a particular video-on-demand provided that the viewer has already watched a particular broadcast television program and a probability that any viewer will purchase the particular video-on-demand.

* * * * *